(12) United States Patent
Tatehata

(10) Patent No.: US 7,095,934 B2
(45) Date of Patent: Aug. 22, 2006

(54) OPTICAL WAVEGUIDE MANUFACTURING METHOD

(75) Inventor: Naoki Tatehata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 70 days.

(21) Appl. No.: 10/478,707

(22) PCT Filed: Feb. 5, 2003

(86) PCT No.: PCT/JP03/01174

§ 371 (c)(1),
(2), (4) Date: Nov. 24, 2003

(87) PCT Pub. No.: WO03/067293

PCT Pub. Date: Aug. 14, 2003

(65) Prior Publication Data

US 2004/0151458 A1    Aug. 5, 2004

(30) Foreign Application Priority Data

Feb. 6, 2002    (JP)    ............. 2002-029240

(51) Int. Cl.
*G02B 6/10* (2006.01)
(52) U.S. Cl. .................... 385/129; 385/132
(58) Field of Classification Search ........ 385/129–132, 385/14
See application file for complete search history.

(56) References Cited

U.S. PATENT DOCUMENTS

| | | | | |
|---|---|---|---|---|
| 5,519,802 A | * | 5/1996 | Field et al. .................. 385/129 |
| 5,562,838 A | * | 10/1996 | Wojnarowski et al. ......... 216/24 |
| 5,764,842 A | * | 6/1998 | Aoki et al. .................. 385/131 |
| 6,026,209 A | * | 2/2000 | Rhee et al. .................. 385/129 |
| 6,177,290 B1 | * | 1/2001 | Jang et al. .................... 438/31 |
| 2004/0047060 A1 | * | 3/2004 | Araki et al. ................. 359/883 |

FOREIGN PATENT DOCUMENTS

| | | | |
|---|---|---|---|
| JP | 63-116428 | | 5/1988 |
| JP | 04161906 A | * | 6/1992 |
| JP | 6-123816 | | 5/1994 |
| JP | 8-262250 | | 10/1996 |
| JP | 10-261713 | | 9/1998 |
| JP | 11-111688 | | 4/1999 |
| JP | 2000-277493 | | 10/2000 |
| JP | 2001-42153 | | 2/2001 |
| JP | 2001-66450 | | 3/2001 |
| JP | 2001-257198 | | 9/2001 |
| WO | WO 9844166 A1 | * | 10/1998 |

* cited by examiner

Primary Examiner—Sung Pak
(74) Attorney, Agent, or Firm—Wenderoth, Lind & Ponack, L.L.P.

(57) ABSTRACT

A method for manufacturing an optical waveguide of the present invention is one in which a mask is provided on the surface of a core layer followed by performing dry etching, and the dry etching step includes etching and ashing steps. With this, the irregularities formed on the periphery of a core pattern during manufacture of an optical waveguide can be eliminated, and an optical waveguide with a low optical transmission loss is proved.

21 Claims, 5 Drawing Sheets

OPTICAL WAVEGUIDE MANUFACTURING METHOD

TECHNICAL FIELD

The present invention relates to a method for manufacturing optical waveguides having a low optical transmission loss.

BACKGROUND ART

As quartz glass based material is used in the core layer of conventional optical waveguides, physical properties of the core layer such as the refractive index and coefficient of thermal expansion are roughly determined by the physical properties of quartz glass. In recent years, there is sometimes a request for changing the physical properties of the core layer. For this reason, proposals have been made to form optical waveguides by using multi-component glass containing such elements as alkaline elements, alkaline earth elements, or rare earth elements. When forming a core layer of an optical waveguide with multi-component glass, physical properties of the glass such as refractive index, thermal expansion coefficient, or glass transition temperature can be freely designed over a wider range by properly changing the glass composition. As a practical method, a core layer is formed on a first clad layer by using glass containing alkaline elements, then the core layer is processed by dry-etching, followed by formation of a second clad.

A problem encountered with the core layer formed with the above-mentioned multi-component glass is that the optical transmission loss of the optical waveguide tends to be large. To be more specific, when making a core pattern from a core layer formed with a conventional multi-component glass, dry etching is performed with a mask or a resist pattern provided over the core layer. During this process, large irregularities are formed on the periphery of the core pattern that has been formed, and the irregularities cause an increase in the optical transmission loss of the optical waveguide.

SUMMARY OF THE INVENTION

It is an object of the present invention to provide an optical waveguide with a small optical transmission loss. The method for manufacturing an optical waveguide of the present invention is one in which a patterned mask or a resist is placed on the surface of a core layer and then dry etching is performed, where the dry etching process includes etching and ashing. As the dry etching process includes not only etching but also ashing, it is possible to reduce irregularities otherwise formed by etching. As a result, an optical waveguide with a small optical transmission loss can be provided.

DETAILED DESCRIPTION OF PREFERRED EMBODIMENTS

Referring to drawings, a description of exemplary embodiments of the present invention will be given in the following.

Embodiment 1

Figure 1:
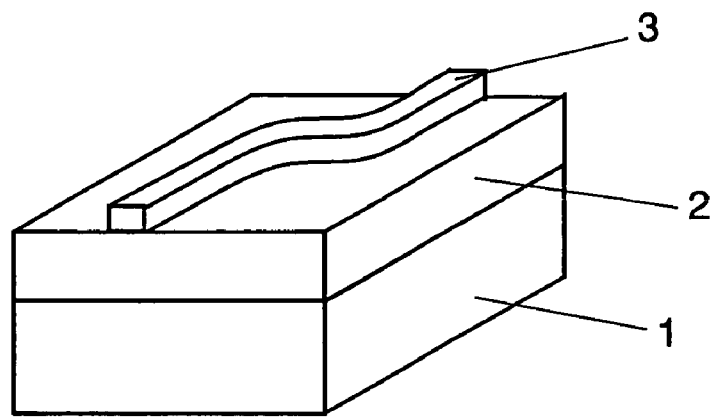
FIG. 1 is a perspective view to illustrate one of the manufacturing steps of the present invention.

FIG. 1 is a perspective view to illustrate one of the manufacturing steps of the present invention. Substrate 1 is silicon or various types of glass, for example. Here, various types of glass mean glass that contains at least one of alkaline elements, alkaline earth elements and rare earth elements. First clad layer 2 is formed with $SiO_2$ or various types of glass.

When the thermal expansion coefficients of substrate 1 and first clad layer 2 are different, thermal stress is sometimes caused. Accordingly, most preferable is that the thermal expansion coefficients of the two are equal, but they can be used when the thermal expansion coefficients are close. Also, when substrate 1 is made of silicon, the first clad may be made by oxidizing silicon into $SiO_2$. Also, substrate 1 and first clad layer 2 may be made of the same material. Core pattern 3 is formed using $SiO_2$ or various types of glass and its refractive index is made slightly greater than that of first clad layer 2.

Figure 2:
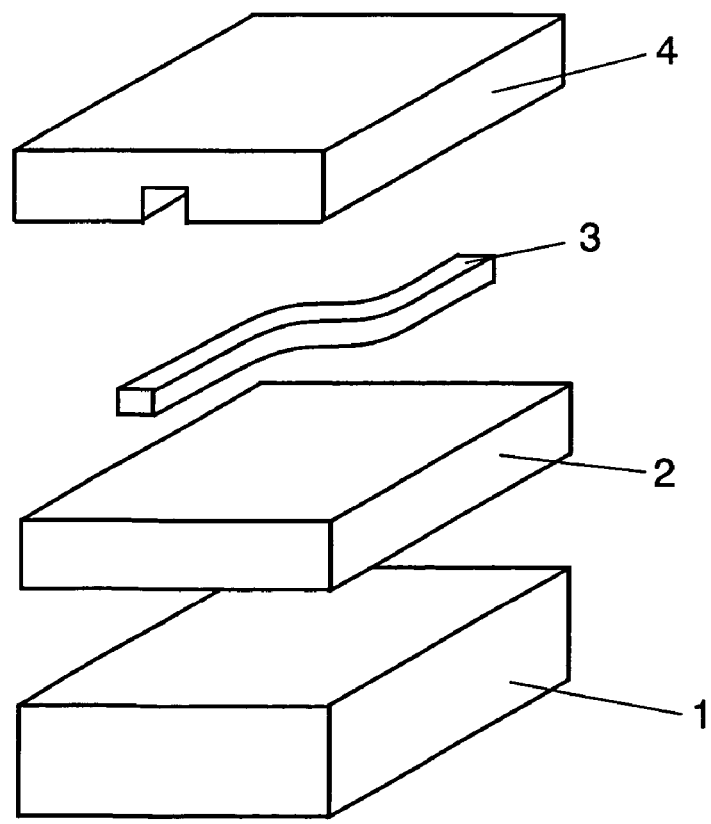
FIG. 2 is a disassembled perspective view of an exemplary embodiment of the present invention.

An optical waveguide is formed by forming second clad layer 4 on first clad layer 2 for covering core pattern 3. FIG. 2 is a disassembled perspective view of an optical waveguide that has been formed. Here, the cross section of core pattern 3 does not need to be rectangular; it can be trapezoidal. Although only one core pattern is shown in FIG. 1 and FIG. 2, two or more straight or curved patterns like this can be formed. For second clad layer 4, a material having a slightly smaller refractive index than that of core pattern 3 is used. The same material as used for first clad layer 2 may be used for second clad layer 4.

As the refractive index of core pattern 3 is greater than those of first clad layer 2 and second clad layer 4, light is confined inside the core pattern due to the difference of the refractive indices, and light transmission through core pattern 3 is enabled. When there are irregularities on the outer surface of core pattern 3, light is scattered by the irregularities and as a result optical transmission loss is caused. Consequently, it is preferable that the outer surface of core pattern 3 that guides light be smooth.

Figure 3:
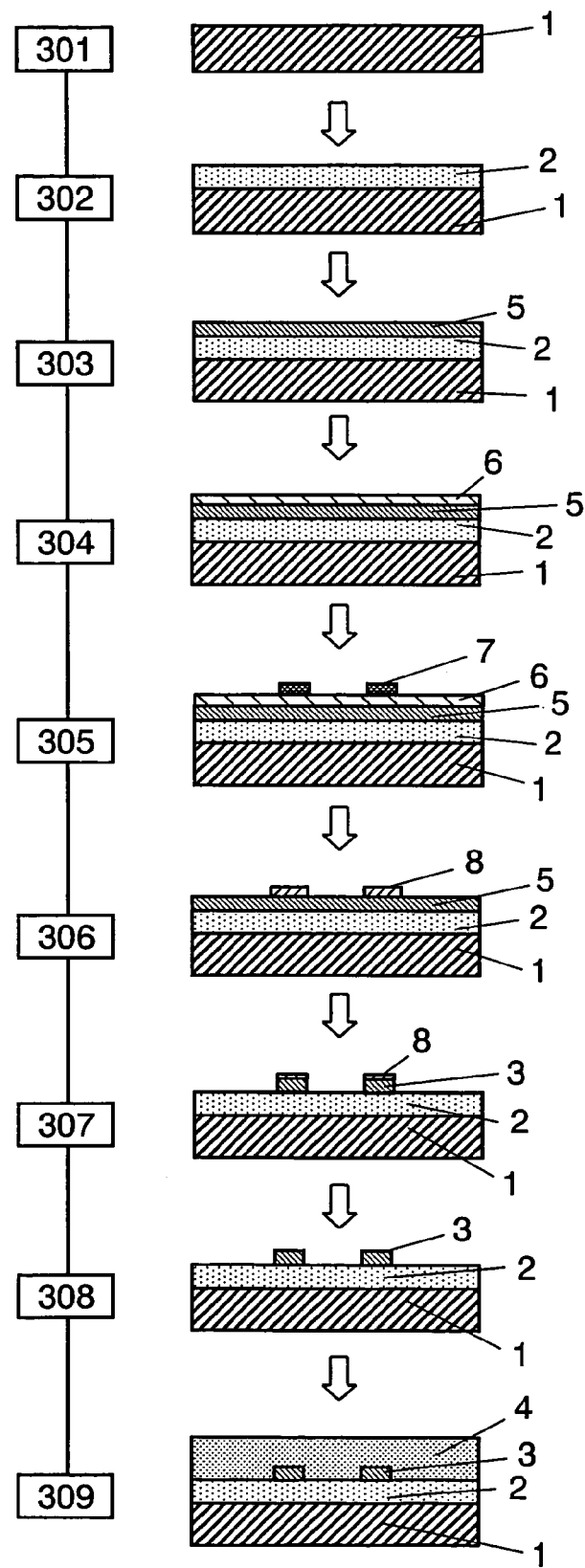
FIG. 3 is a cross-sectional view to illustrate the manufacturing steps in an exemplary embodiment of the present invention.

Next, referring to FIG. 3, a description will be given of the method for manufacturing an optical waveguide. In substrate preparation step 301, substrate 1 is prepared. In first clad formation step 302, first clad layer 2 is formed on substrate 1. Here, substrate 1 may be made of the same material as that of first clad layer 2, in which case first clad formation step 302 can be omitted. In the subsequent core layer formation step 303, core layer 5 is formed with various types of glass. Mask layer 6 is formed in the next mask layer formation step 304. Mask layer 6 is made of a metal such as silicon, titanium, tungsten, nickel or chromium, or a semiconductor or an alloy of these metals. A film is deposited by sputtering, vacuum deposition or other method.

Next, in resist processing step 305, resist pattern 7 is formed by a photolithographic process by coating a resist. Subsequently, in masking step 306, mask layer 6 is processed by dry etching using resist pattern 7 as the mask to obtain mask pattern 8. Here, generally, the thinner resist pattern 7 is, the higher the patterning accuracy becomes. Accordingly, when etching, it is preferable that the ratio of the etching rate of resist pattern 7 to the etching rate of mask layer 6 be smaller. Next, in core etching step 307, core pattern 3 is formed by dry etching core layer 5 via mask pattern 8. Core etching step 307 is described below in detail.

Taking reactive ion etching as an example, a description of dry etching will be given. As the etching gas, gas that contains fluorocarbons such as $CF_4$, $CHF_3$ or $C_4F_8$, a sulfur-based gas such as $SF_6$, an inert gas such as Ar or Xe, and oxygen, hydrogen, or mixed gas of these gases can be considered. Here, mask pattern 8 is a mask to be used for patterning of core layer 5 by etching. This mask pattern 8 is etched practically simultaneously when core layer 5 is etched. Generally speaking, the thinner mask pattern 8 is, the higher the patterning accuracy becomes.

Consequently, when etching, it is preferable that the ratio (hereinafter selective etching ratio) of the etching rate of core layer 5 to the etching rate of mask pattern 8 is as high as possible. When mask pattern 8 is made of material that contains tungsten and silicon, it was possible to increase the selective etching ratio. In this case, as mask layer 6, it is necessary to deposit a film of a material that contains tungsten and silicon. Film deposition of this multi-component material was performed by sputtering. Also, when etching was performed with etching gas that contains fluorocarbons such as $CF_4$, $CHF_3$ and $C_4F_8$, a further higher selective etching ratio was obtained.

When forming core pattern 3 by dry etching, the following problems are encountered. That is, when etching glass that contains alkaline elements, alkaline earth elements or rare earth elements with a gas that contains fluorocarbons, sometimes irregularities attributable to those elements are caused on the outer surface of core pattern 3. To be more specific, when first glass that does not contain these elements and second glass that contains these elements are etched under the same conditions, flat etching can be performed on the first glass without any irregularities whereas, in the second glass, there occurs a case in which irregularities are generated disabling flat etching.

A description of the mechanism of formation of the irregularities will now be given taking, as an example, the case of etching glass having $SiO_2$ as the main constituent and containing sodium, being an alkaline element, and using $CF_4$ as the etching gas. The silicon element contained in the glass react with $CF_4$ and is removed as silicon fluoride. As silicon fluoride has a low boiling point and high volatility, it is easy to remove. On the other hand, the sodium element contained in the glass reacts with $CF_4$ and is removed as sodium fluoride. As this sodium fluoride has a high boiling point and low volatility, it is not easily removed. The difference in the removability between sodium fluoride and silicon fluoride is the main reason for the formation of irregularities.

When etching glass containing alkaline elements, alkaline earth elements or rare earth elements in this way, sometimes irregularities are formed while etching is under way. Such irregularities are also formed on the outer surface of the core pattern that has been formed and causes an increase in the optical transmission loss of the optical waveguide. In order to reduce the irregularities, it is effective to make dominant use of physical etching in which the difference of etching rates among elements is small. Physical etching can be made dominant by mixing inert gas such as Ar or Xe in the etching gas and performing etching by using high density plasma generated by using an inductively coupled plasma source, a surface wave type plasma source, an antenna type plasma source, a magnetron type plasma source, a helicon wave type plasma source, an electron cyclotron resonance type plasma source, or a magnetic neutral line type plasma source thereby enabling reduction of irregularities.

However, even when the above etching is performed, irregularities are sometimes formed during etching. This is attributable to accumulation of adherent materials on the glass surface during etching, and the adherent materials cause irregularities on the surface of the glass to be etched.

Figure 4:
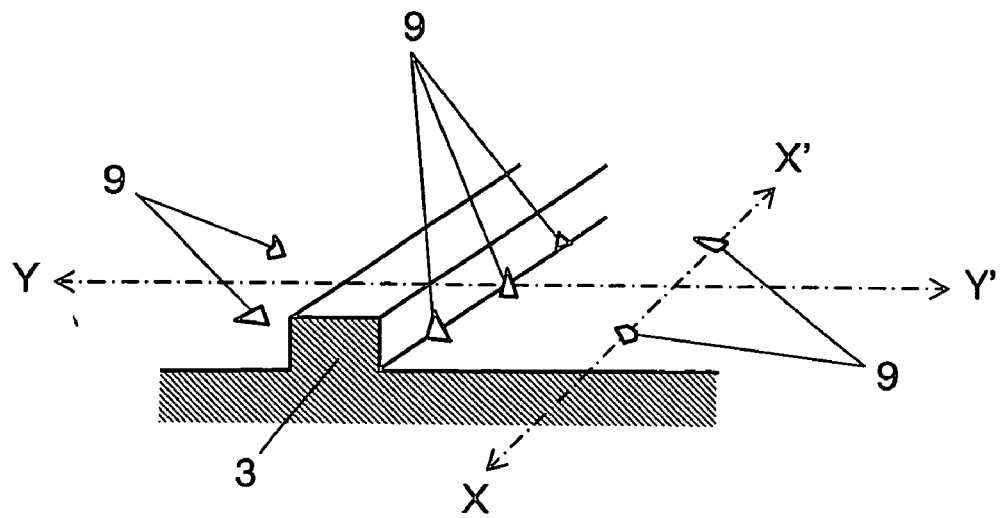
FIG. 4 is a perspective view of a prior art example.

A description of the accumulation of adherent materials will be given with reference to FIG. 4. When core pattern 3 is formed by etching core layer 5, mask pattern 8 not shown in FIG. 4 is also etched at the same time. Reaction products of the elements contained in core layer 5 and reaction products of the elements contained in mask pattern 8 are removed together with the etching gas. At this time, some of the reaction products are not fully removed and adhere to the surfaces of core layer 5 and core pattern 3 thus forming adherent materials 9.

Figure 5:
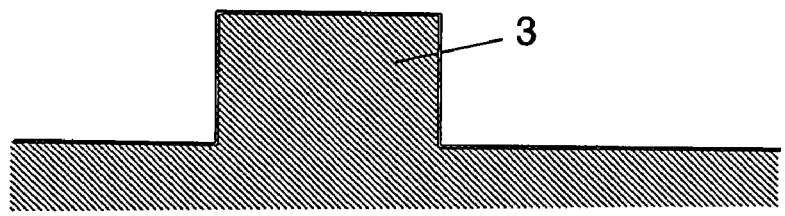
FIG. 5 is a cross-sectional view of one of the manufacturing steps of the present invention.
Figure 6:
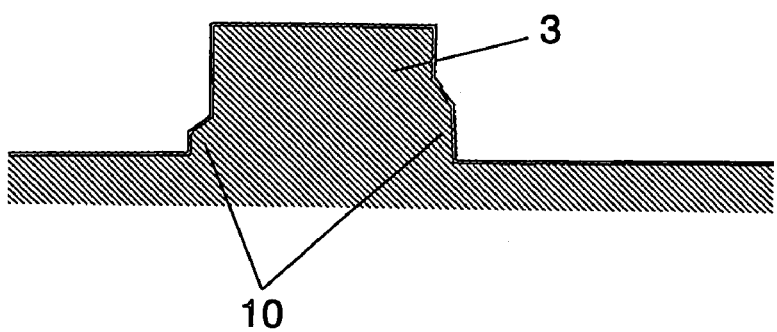
FIG. 6 is a cross-sectional view of a plane cut along the line Y–Y' of FIG. 4.
Figure 7:
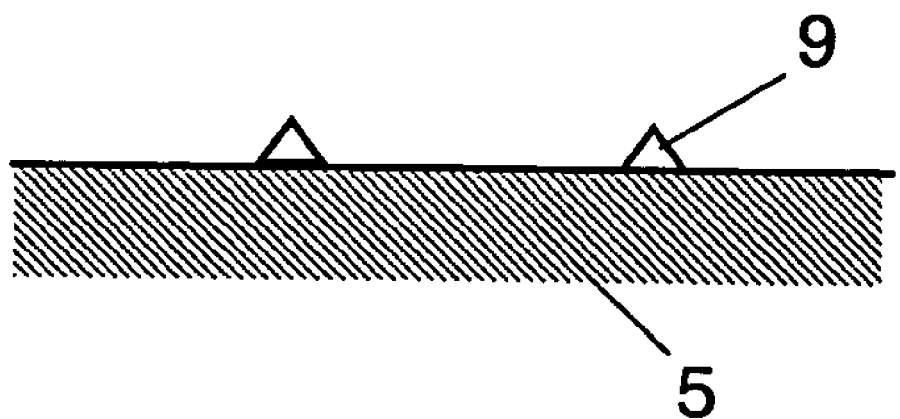
FIG. 7 is a cross-sectional view of a step in a prior art example.
Figure 8:
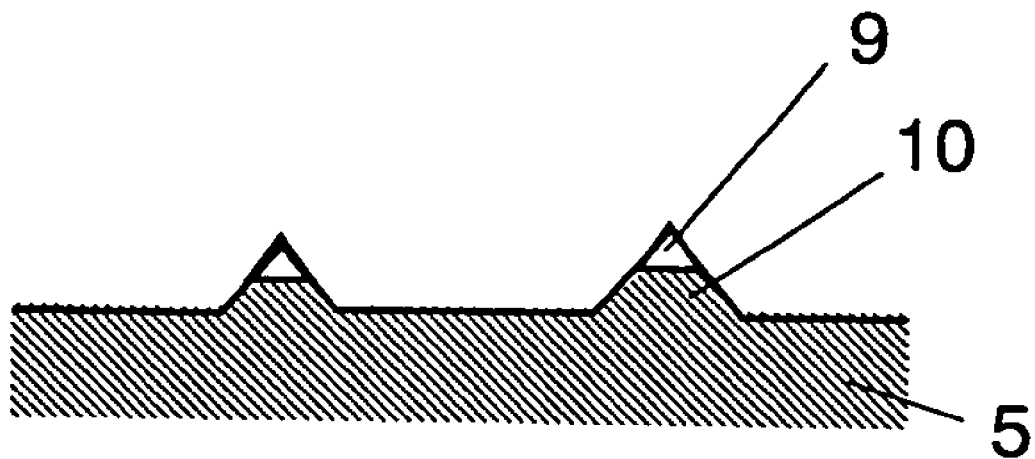
FIG. 8 is a cross-sectional view of a plane cut along the line X–X' of FIG. 4.

FIG. 7 shows the cross section as cut along the line X–X' in FIG. 4. As shown in FIG. 7, adherent materials 9 behave like a mask during etching. Accordingly, as etching proceeds, irregularities 10 are formed on the surface of core layer 5 as illustrated in FIG. 8. FIG. 6 shows the cross section as cut along the line Y–Y' in FIG. 4. When there is no adherent material 9, the core pattern will show a desired shape such as a rectangle in FIG. 5. However, adherent materials 9 will adhere on the outer surface of core pattern 3, too. As a result, as the etching proceeds, irregularities 10 are formed on the outer surface of core pattern 3 as illustrated in FIG. 6.

It is desirable that the outer surface of core pattern 3 that guides light be smooth. When irregularities 10 exist, light is scattered by irregularities 10 and causes optical transmission loss. In order to reduce optical transmission loss, it is necessary to remove or at least reduce irregularities 10. In order to reduce irregularities 10, it is necessary to remove adherent materials 9 that are produced during etching. These adherent materials 9 can be removed by ashing. When etching core layer 5 with $CF_4$ as the etching gas, irregularities 10 can be removed by ashing with an oxygen gas.

Suppose that etching conditions were set by using mixed gas of $CF_4$ and Ar, etching was performed for 10 minutes, adherent materials 9 accumulated on the surface during etching, and irregularities 10 have formed. In this case, etching was performed for 3 minutes under the same conditions followed by ashing for 3 minutes, and adherent materials 9 were removed.

As has been described above, irregularities 10 can be reduced by including etching and ashing in core etching step 307.

In order to increase the amount of etching while reducing irregularities 10, it is effective to alternately repeat etching and ashing such as first etching for 3 minutes, followed by ashing for 3 minutes, and then performing another round of etching for 3 minutes and ashing for 3 minutes (i.e., repeatedly etching and ashing in an alternating manner.

Here, though an etching time of 3 minutes was given as an example, it can be set at an arbitrary length, and the etching time and the ashing time can be different. Also, two or more combinations of different etching conditions and ashing conditions may be repeated for arbitrary lengths of time. For example, in the first step, etching is performed for 8 minutes under predetermined condition E01, and then etching is performed for 2 minutes under other condition E02, followed by ashing for 3 minutes under predetermined condition A01. In the subsequent second step, etching is performed for 5 minutes under condition E01 again, etching for 1 minute under condition E02, followed by ashing for 2 minutes under condition A01. Etching and ashing can be alternately repeated such as by subsequently performing the second cycle once more. By a process that effectively combines etching and ashing, irregularities 10 can be reduced and core pattern 3 of a desired configuration can be processed.

In the above, a description was made of reactive ion etching as an example. However, a similar effect can be obtained by employing another etching method and ashing method in which plasma is generated in a vacuum apparatus.

In mask removal step 308 that follows core etching step 307 as described above, core pattern 3 is exposed by removing mask pattern 8. FIG. 1 shows an example of a state in which core pattern 3 has been formed. Subsequently, in second clad formation step 309 in FIG. 3, second clad layer 4 is formed to obtain an optical waveguide. In FIG. 3, two core patterns are shown as an example. In FIG. 2 that illustrates a completed optical waveguide, only one core pattern is shown as an example.

The above-described embodiment 1 is summarized below.

Core layer 5 is formed on first clad layer 2, and then mask pattern 8 is provided on the surface of core layer 5. Subsequently, core pattern 3 is formed by performing dry etching of core layer 5, and then second clad layer 4 is formed on first clad layer 2 in a manner such that it covers core pattern 3.

Embodiment 2

Figure 9:
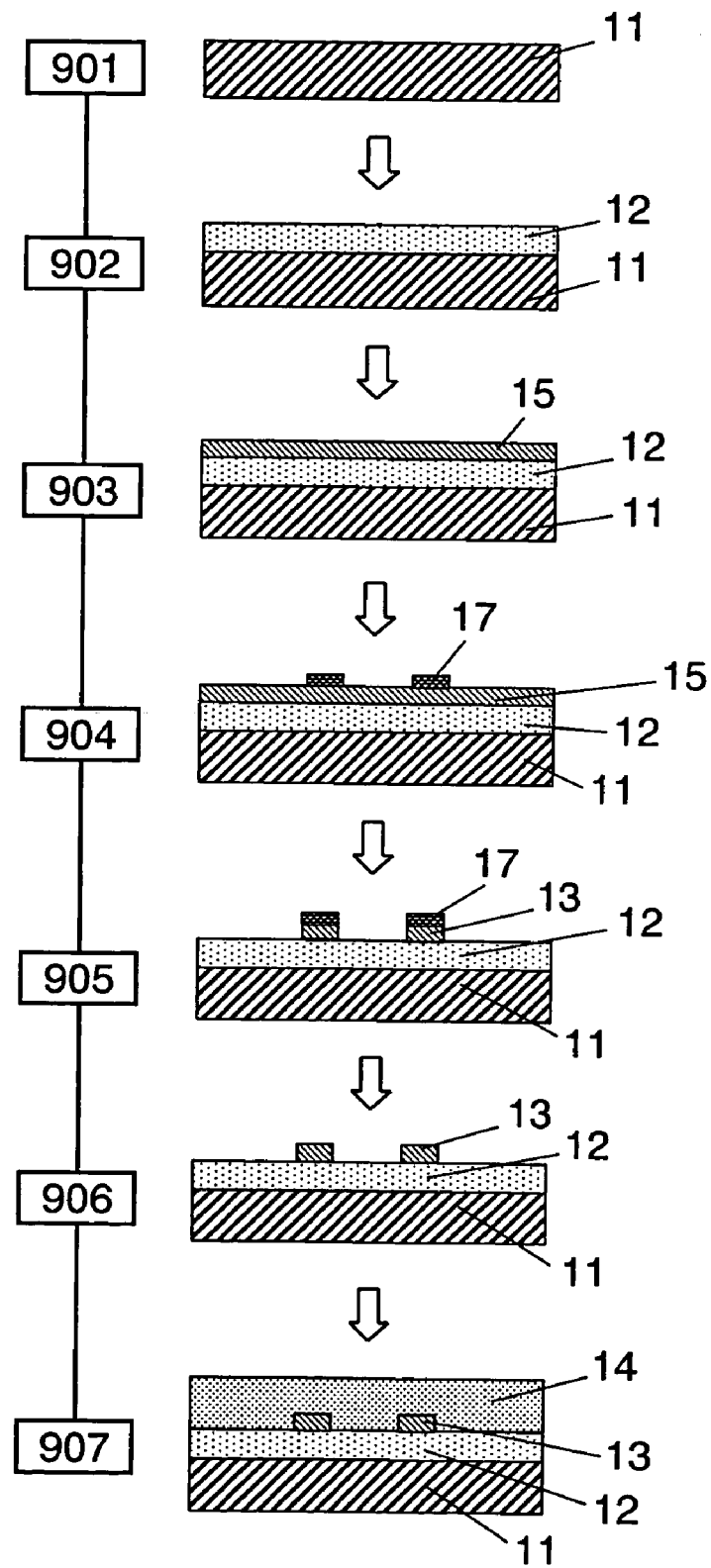
FIG. 9 is a cross-sectional view to illustrate the manufacturing steps in an exemplary embodiment of the present invention.

Referring to FIG. 9, a description of another exemplary embodiment will be given.

Subsequent to substrate preparation step 901, first clad layer 12 is formed on substrate 11 in first clad formation step 902. In core layer formation step 903, core layer 15 is formed on first clad layer 12, and in subsequent resist processing step 904, resist pattern 17 is provided on the surface of core layer 15. Next, in core etching step 905, core pattern 13 is formed by dry etching core layer 15. After removing resist pattern 17 in resist removal step 906, second clad layer 14 is formed on first clad layer 12 in second clad formation step 907 in a manner such that it covers core pattern 13, thus completing an optical waveguide. In summary, in the embodiment 2, resist pattern 17 itself works as a mask for dry etching.

In the first and second exemplary embodiments, a description was given of examples of methods for manufacturing an optical waveguide that has a core layer consisting of a glass material that contains alkaline elements, alkaline earth elements, or rare earth elements.

Similar effects can be obtained when the core layer is replaced with a single crystal material rather than a glass material. That is, an optical waveguide employing a core layer made of a single crystal material that contains alkaline elements, alkaline earth elements, transition elements, or rare earth material is formed as shown in substrate preparation step 301 through mask removal step 309 of FIG. 3.

Here, as shown in FIG. 2, there is a case in which air is assumed as the second clad layer instead of forming $SiO_2$ as second clad layer 4 of an optical waveguide. In this case, second clad formation step 309 or 907 is omitted.

That is, the present invention features perfoming not only etching but also ashing in the dry etching step of the core layer in a method for manufacturing an optical waveguide in which a patterned mask or resist is provided on the surface of a core layer and then a core pattern is formed by performing dry etching. With this, irregularities that are formed when performing etching can be reduced. As the core layer, a glass material that contains at least one of the elements from alkaline elements, alkaline earth elements, or rare earth elements can be used. Also, a single crystal material that contains at least two elements from alkaline elements, alkaline earth elements, transition elements, or rare earth elements may be used.

Also, by repeating etching and ashing, the amount of etching can be increased while keeping irregularities small.

When etching the material for forming the core layer, the ratio of the etching rate of the core layer to the etching rate of mask or resist is called the selective etching ratio. By using gas containing fluorocarbons such as $CF_4$, $CHF_3$ or $C_4F_8$ for etching, it is possible to increase the selective etching ratio to a relatively large value.

Also, by using a material containing tungsten and silicon as the mask to be used, the selective etching ratio can also be made relatively large.

Also, irregularities formed by etching can be further reduced by using mixed gas including inert gases such as Ar, Kr, and Xe. Moreover, by using oxygen-containing gas for ashing, the irregularities formed by etching can be further reduced.

When material containing two or more kinds of elements is used as the mask, a mask layer can be formed with ease by sputtering. Also, by processing the mask by dry etching, a mask with an excellent configuration can be formed.

As the plasma source for use in a vacuum chamber, at least one of an inductively-coupled plasma source, a surface wave plasma source, an antenna type plasma source, a magnetron type plasma source, a helicon wave type plasma source, an electron cyclotron resonance type plasma source, and a magnetic neutral line type plasma source can be used. By performing dry etching using plasma generated in a vacuum chamber, irregularities formed by etching can be made small. Among various dry etching methods, by using reactive ion etching which enables anisotropic etching, it is possible to obtain a desired configuration when etching a core layer.

Also, by performing dry etching of a mask and dry etching of a core layer in the same processing chamber, continuous processing is enabled thus enhancing workability.

In a method for manufacturing an optical waveguide by using multi-component glass that contains at least one of the alkaline elements, alkaline earth elements, or rare earth elements, or by using a single crystal material that contains at least two of the alkaline elements, alkaline earth elements, transition elements, and rare earth elements, formation of the first clad layer, second clad layer, or the core layer can be performed by using sputtering.

Furthermore, in a method for manufacturing an optical waveguide in which a mask or resist is provided on the surface of a core layer and then a core pattern is formed by dry etching, the present invention enables reduction of irregularities formed by etching by including ashing in the dry etching process.

INDUSTRIAL APPLICABILITY

As has been described above, the present invention is a method for manufacturing an optical waveguide by providing a mask or resist on the surface of a core layer followed by performing dry etching, in which the dry etching step includes etching and ashing processes. By including in the dry etching step an ashing process that follows an etching process, reduction of irregularities formed by performing etching is enabled. With this, an optical waveguide having a low optical transmission loss is provided.

The invention claimed is:

1. A method of manufacturing an optical waveguide having a core on a first clad layer, said method comprising:
    forming a core layer on the first clad layer, said core layer being a glass core layer made of glass material containing at least one element selected from a group consisting of alkaline elements, alkaline earth elements, and rare earth elements;
    forming a mask layer on a surface of the core layer so as to form a mask pattern over the core layer;
    core etching the core layer by dry etching using a mixed gas containing at least fluorocarbons and using the mask pattern so as to pattern the core layer to form the core, said core etching comprising repeatedly etching and ashing the core layer in an alternating manner; and
    removing the mask pattern after said core etching.

2. The method of claim 1, wherein said core etching comprises repeatedly etching and ashing at least two times each in an alternating manner, and finishing said core etching with said ashing.

3. The method of claim 1, further comprising forming a second clad layer over the core after said core etching so that the second clad layer covers the core.

4. The method of claim 3, wherein said forming of the second clad layer comprises forming the second clad layer by sputtering material selected from a group consisting of SiO2 and a glass material for covering the core.

5. The method of claim 1, wherein said dry etching comprises reactive ion etching.

6. The method of claim 1, wherein the mixed gas further contains an inert gas.

7. The method of claim 1, wherein said ashing comprises using a gas containing oxygen.

8. The method of claim 1, wherein said dry etching is performed in a vacuum chamber by using generated plasma.

9. The method of claim 1, wherein the mask layer is one film or a combination of at least two films selected from a group consisting of a resist film, metal film and semiconductor film.

10. The method of claim 1, wherein the mask layer is formed with material containing tungsten and silicon.

11. The method of claim 1, wherein said forming of the mask layer comprises forming the mask layer by sputtering.

12. The method of claim 1, wherein said forming of the mask layer comprises patterning the formed mask layer by dry etching so as to form the mask pattern.

13. The method of claim 12, wherein said dry etching comprises reactive ion etching.

14. The method of claim 12, wherein said dry etching is performed in a vacuum chamber by using generated plasma.

15. The method of claim 14, wherein said dry etching comprises generating plasma using at least one plasma source selected from a group consisting of an inductively-coupled plasma source, a surface wave plasma source, an antenna plasma source, a magnetron plasma source, a helicon wave plasma, an electron cyclotron resonance plasma source, and a magnetic neutral line plasma source.

16. The method of claim 12, wherein said dry etching of the mask layer and said dry etching of the core layer are both performed in the same processing chamber.

17. The method of claim 1, wherein said forming of the core layer comprises forming the core layer by sputtering.

18. The method of claim 1, further comprising forming said first clad layer on a substrate by sputtering.

19. The method of claim 1, wherein the core layer is formed of glass material containing at least one element selected from a group consisting of alkaline elements, alkaline earth elements, and rare earth elements.

20. The method of claim 1, wherein the core layer is formed of a single crystal material containing at least one element selected from a group consisting of alkaline elements, alkaline earth elements, transition elements, and rare earth elements.

21. The method of claim 1, wherein said ashing comprises ashing to remove adherent materials on the core layer.

* * * * *